(12) United States Patent
Kesselman et al.

(10) Patent No.: US 9,081,841 B2
(45) Date of Patent: *Jul. 14, 2015

(54) ASYNCHRONOUS DISTRIBUTED GARBAGE COLLECTION FOR REPLICATED STORAGE CLUSTERS

(71) Applicant: GOOGLE INC., Mountain View, CA (US)

(72) Inventors: Alexander Kesselman, Sunnyvale, CA (US); Alexandre Drobychev, San Jose, CA (US)

(73) Assignee: GOOGLE INC., Mountain View, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 13/732,041

(22) Filed: Dec. 31, 2012

(65) Prior Publication Data

US 2013/0124470 A1  May 16, 2013

Related U.S. Application Data

(63) Continuation of application No. 12/644,689, filed on Dec. 22, 2009, now Pat. No. 8,346,820.

(60) Provisional application No. 61/139,853, filed on Dec. 22, 2008.

(51) Int. Cl.
*G06F 17/30* (2006.01)
*G06F 3/06* (2006.01)
*G06F 12/02* (2006.01)

(52) U.S. Cl.
CPC ........ *G06F 17/30578* (2013.01); *G06F 3/0605* (2013.01); *G06F 3/067* (2013.01); *G06F 3/0619* (2013.01); *G06F 3/0652* (2013.01); *G06F 17/30215* (2013.01); *G06F 12/0269* (2013.01)

(58) Field of Classification Search
CPC ............ G06F 12/0253; G06F 12/0269; G06F 12/0276; G06F 2212/702; G06F 2212/7205
USPC .......................... 707/813, 814, 816, 999.206
See application file for complete search history.

(56) References Cited

U.S. PATENT DOCUMENTS

| | | | |
|---|---|---|---|
| 4,665,520 A | 5/1987 | Strom et al. | |
| 5,446,901 A * | 8/1995 | Owicki et al. | ................ 711/154 |

(Continued)

FOREIGN PATENT DOCUMENTS

| | | |
|---|---|---|
| JP | 2002-132563 | 5/2002 |
| JP | 2004-289843 | 10/2004 |

(Continued)

OTHER PUBLICATIONS

Google Inc., Communication pursuant to Article 94(3) EPC, EP 09833898.1, Mar. 30, 2012, 6 pgs.

(Continued)

*Primary Examiner* — Mohammed R Uddin
(74) *Attorney, Agent, or Firm* — Morgan, Lewis & Bockius LLP

(57) ABSTRACT

A method may be performed by a device of a group of devices in a distributed data replication system. The method may include storing objects in a data store, at least one or more of the objects being replicated with the distributed data replication system, and conducting a scan of the objects in the data store. The method may further include identifying one of the objects as not having a reference pointing to the object, storing a delete negotiation message as metadata associated with the one of the objects, and replicating the metadata with the delete negotiation message to one or more other devices of the group of devices.

14 Claims, 9 Drawing Sheets

(56) References Cited

U.S. PATENT DOCUMENTS

| | | | |
|---|---|---|---|
| 5,485,613 A * | 1/1996 | Engelstad et al. | 1/1 |
| 5,852,666 A * | 12/1998 | Miller et al. | 713/167 |
| 6,324,549 B1 * | 11/2001 | Gomi et al. | 1/1 |
| 6,513,059 B1 | 1/2003 | Gupta et al. | |
| 6,594,698 B1 | 7/2003 | Chow et al. | |
| 6,615,383 B1 | 9/2003 | Talluri et al. | |
| 6,839,752 B1 | 1/2005 | Miller et al. | |
| 6,865,657 B1 * | 3/2005 | Traversat et al. | 711/170 |
| 8,346,820 B2 | 1/2013 | Kesselman et al. | |
| 2006/0002388 A1 | 1/2006 | Grebus et al. | |
| 2006/0259489 A1 | 11/2006 | Bernabeu-Auban et al. | |
| 2007/0174567 A1 | 7/2007 | Deguchi et al. | |
| 2008/0168106 A1 * | 7/2008 | Freedman | 707/201 |
| 2008/0170563 A1 * | 7/2008 | Zhu et al. | 370/352 |
| 2008/0256143 A1 | 10/2008 | Reddy et al. | |
| 2008/0294696 A1 | 11/2008 | Frandzel | |

FOREIGN PATENT DOCUMENTS

| | | |
|---|---|---|
| JP | 2005-504455 | 2/2005 |
| JP | 2006/185041 | 7/2006 |
| JP | 2007-199920 | 8/2007 |
| JP | 2008/158661 | 7/2008 |
| WO | WO02/087136 | 10/2002 |
| WO | WO2007/067480 | 6/2007 |
| WO | WO2008/005212 | 1/2008 |
| WO | WO2008/115770 | 9/2008 |

OTHER PUBLICATIONS

Google Inc., International Preliminary Report on Patentability, PCT/US2009/069228, Mar. 24, 2011, 15 pgs.

Google Inc., Notification of the First Office Action, CN 200980156985.4, Jan. 29, 2013, 6 pgs.

Google Inc., Notification of the Second Office Action, CN 200980156985.4, Sep. 29, 2013, 4 pgs.

Google Inc., Notification on the Grant of Patent Right for Invention, CN 200980156985.4, Apr. 1, 2014.

Google Inc., Office Action, CA 2747786, Aug. 23, 2013, 2 pgs.

Google Inc., Patent Examination Report No. 1, AU 2009330067, Jul. 10, 2012, 3 pgs.

Galgamez et al., "Garbage Collection for Mobile and Replicated Objects", Lecture Notes in Computer Science, vol. 1725/1010, Nov. 27, 1999, pp. 379-387, XP002399898.

Guy et al., "Consistency Algorithms for Optimistic Replication", Network Protocols, Oct. 19, 1993, XP010095568.

Notification of Transmittal of the International Search Report and the Written Opinion of the International Searching Authority, or the Declaration corresponding to PCT/US2009/069228, mailed Sep. 24, 2010, 12 pages.

Chang, F. et al.: "Bigtable: A Distributed Storage System for Structured Data", OSDI '06: 7th USENIX Symposium on Operating Systems Design and Implementation, pp. 205-218.

Brodie-Tyrrell, W. et al.: "Garbage Collection for Storage-Oriented Clusters", Proc. ACSC 2004, 10 pages.

Veiga, L. et al.: "Asynchronous, Complete Distributed Garbage Collection ", Apr. 2005, Nineteenth IEEE International Symposium on Parallel and Distributed Processing, Denver, CO, 20 pages.

Shapiro, M. et al.: "Recent Advances in Distributed Garbage Collection", Feb. 2000, vol. 1752, Lecture Notes in Computer Science, Springer-Verlag, pp. 104-126.

* cited by examiner

ASYNCHRONOUS DISTRIBUTED GARBAGE COLLECTION FOR REPLICATED STORAGE CLUSTERS

RELATED APPLICATION

This application is a continuation of U.S. application Ser. No. 12/644,689, filed Dec. 22, 2009, now U.S. Pat. No. 8,346,820, which claims priority under 35 U.S.C. §119 based on U.S. Provisional Patent Application No. 61/139,853, filed Dec. 22, 2008, the disclosures of which are incorporated by reference herein.

BACKGROUND

The enterprise computing landscape has undergone a fundamental shift in storage architectures in that central-service architecture has given way to distributed storage clusters. As businesses seek ways to increase storage efficiency, such clusters built of commodity computers can deliver high performance, availability and scalability for new data-intensive applications at a fraction of cost compared to monolithic disk arrays. To unlock the full potential of storage clusters, the data is replicated across multiple geographical locations increasing availability and reducing network distance from clients.

Garbage collection can be a problem for administratively decentralized storage systems which manage large distributed objects. A garbage collector is responsible for reclaiming disk space by deleting objects that are no longer referenced. Distributed garbage collection in storage clusters is further complicated by common failures of machines and network partitions, which make it difficult if not impossible to get a global synchronous view of objects and their references.

SUMMARY

According to one implementation, a method may be performed by a device of a group of devices in a distributed data replication system. The method may include storing objects in a data store, at least one or more of the objects being replicated with the distributed data replication system; conducting a scan of the objects in the data store; identifying one of the objects as not having a reference pointing to the object; storing a delete negotiation message as metadata associated with the one of the objects; and replicating the metadata with the delete negotiation message to one or more other devices of the group of devices.

According to another implementation, a device of a group of devices in a distributed data replication system may include means for identifying an object in a data store as having a negotiation message associated with the object; means for associating a new negotiation message with the object, the new negotiation message based on the status of the object; means for replicating the new negotiation message to a storage cluster; means for receiving other negotiation messages associated with a replica of the object; and means for deleting the object if the other negotiation messages indicate a successful negotiation.

According to yet another implementation, a system may include a memory, to store instructions and a data store, and a processor. The processor may execute instructions in the memory to identify a status of an object in the data store, the status relating to whether the object has a reference and whether a delete negotiation message is associated with the object, write a new negotiation message to the object metadata based on the status of the object, replicate the metadata with the new negotiation message to one or more devices, and receive, from one of the one or more devices, other negotiation messages associated with the object, where the new negotiation message and the other negotiation messages provide a consensus for a delete negotiation of the object.

According to still another implementation, a method may include exchanging, among storage clusters within a distributed multi-master data replication system, one or more delete negotiation messages, where each of the delete negotiation messages is included in metadata of an object that is the subject of the delete negotiation message, and where the delete negotiation message is sent among the storage clusters using a replication layer of the distributed multi-master data replication system; and deleting the object if a distributed consensus is reached among the storage clusters based on the one or more delete negotiation messages.

According to a further implementation, a computer-readable memory may include computer-executable instructions. The computer-readable memory may include one or more instructions to identify a status of an object in a data store, the status relating to whether the object has a reference and whether a delete negotiation message is associated with the object; one or more instructions to write, to metadata of the object, a new negotiation message associated with the object based on the status of the object; one or more instructions to replicate the object metadata with the new negotiation message to a storage cluster; one or more instructions to receive, from one or more other devices, other negotiation messages associated with the object; and one or more instructions to determine consensus for a delete negotiation of the object based on the other negotiation messages associated with the object.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention.

Systems and/or methods described herein may perform asynchronous distributed garbage collection for replicated storage clusters. Implementations described herein may use the underlying replication layer of a distributed multi-master data replication system to transport delete negotiation messages between different clusters of the distributed multi-master data replication system. An object may be deleted when a distributed consensus is reached that neither live references nor replicated references are present in the system.

Exemplary Network Configuration

Figure 1:
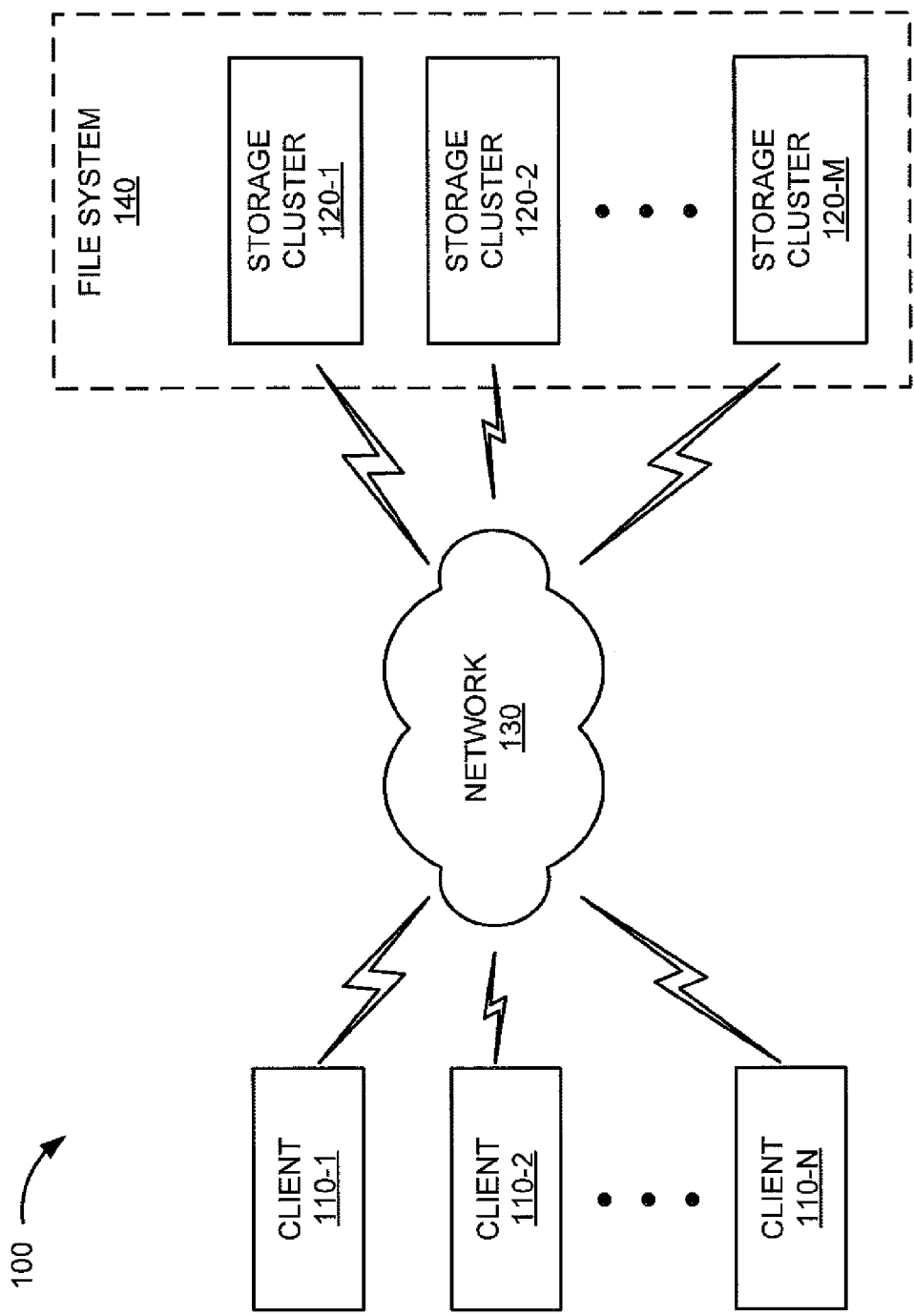
FIG. 1 is a diagram of an exemplary network in which systems and methods described herein may be implemented.

FIG. 1 is a diagram of an exemplary system 100 in which systems and methods described herein may be implemented. System 100 may include clients 110-1 through 110-N (collectively referred to as clients 110) and storage clusters 120-1 through 120-M (collectively referred to as storage clusters 120) connected via a network 130. Storage clusters 120 may form a file system 140 (as shown by the dotted line in FIG. 1).

Network 130 may include one or more networks, such as a local area network (LAN), a wide area network (WAN), a telephone network, such as the Public Switched Telephone Network (PSTN), an intranet, the Internet, a similar or dissimilar network, or a combination of networks. Clients 110 and storage clusters 120 may connect to network 130 via wired and/or wireless connections.

Clients 110 may include one or more types of devices, such as a personal computer, a wireless telephone, a personal digital assistant (PDA), a lap top, or another type of communication device, a thread or process running on one of these devices, and/or objects executable by these devices. In one implementation, a client 110 includes, or is linked to, an application on whose behalf client 110 communicates with storage cluster 120 to read or modify (e.g., write) file data.

Storage cluster 120 may include one or more server devices, or other types of computation or communication devices, that may store, process, search, and/or provide information in a manner described herein. In one implementation, storage cluster 120 may include one or more servers (e.g., computer systems and/or applications) capable of maintaining a large-scale, random read/write-access data store for files. The data store of storage cluster 120 may permit an indexing system to quickly update portions of an index if a change occurs. The data store of storage cluster 120 may include one or more tables (e.g., a document table that may include one row per uniform resource locator (URL), auxiliary tables keyed by values other than URLs, etc.). In one example, storage cluster 120 may be included in a distributed storage system (e.g., a "Bigtable" as set forth in Chang et al., "Bigtable: A Distributed Storage System for Structured Data," Proc. of the 7th OSDI, pp. 205-218 (November 2006)) for managing structured data (e.g., a random-access storage cluster of documents) that may be designed to scale to a very large size (e.g., petabytes of data across thousands of servers).

Although not shown in FIG. 1, system 100 may include a variety of other components, such as one or more dedicated consumer servers or hubs. As used herein, a component may include hardware or a combination of software and hardware. A consumer server, for example, may store a read-only copy of a data store from one or more storage clusters 120 for access by clients 110. A hub, for example, may store a read-only copy of a data store from one or more storage clusters 120 for distribution to one or more consumer servers.

Exemplary Storage Cluster Configuration

Figure 2:
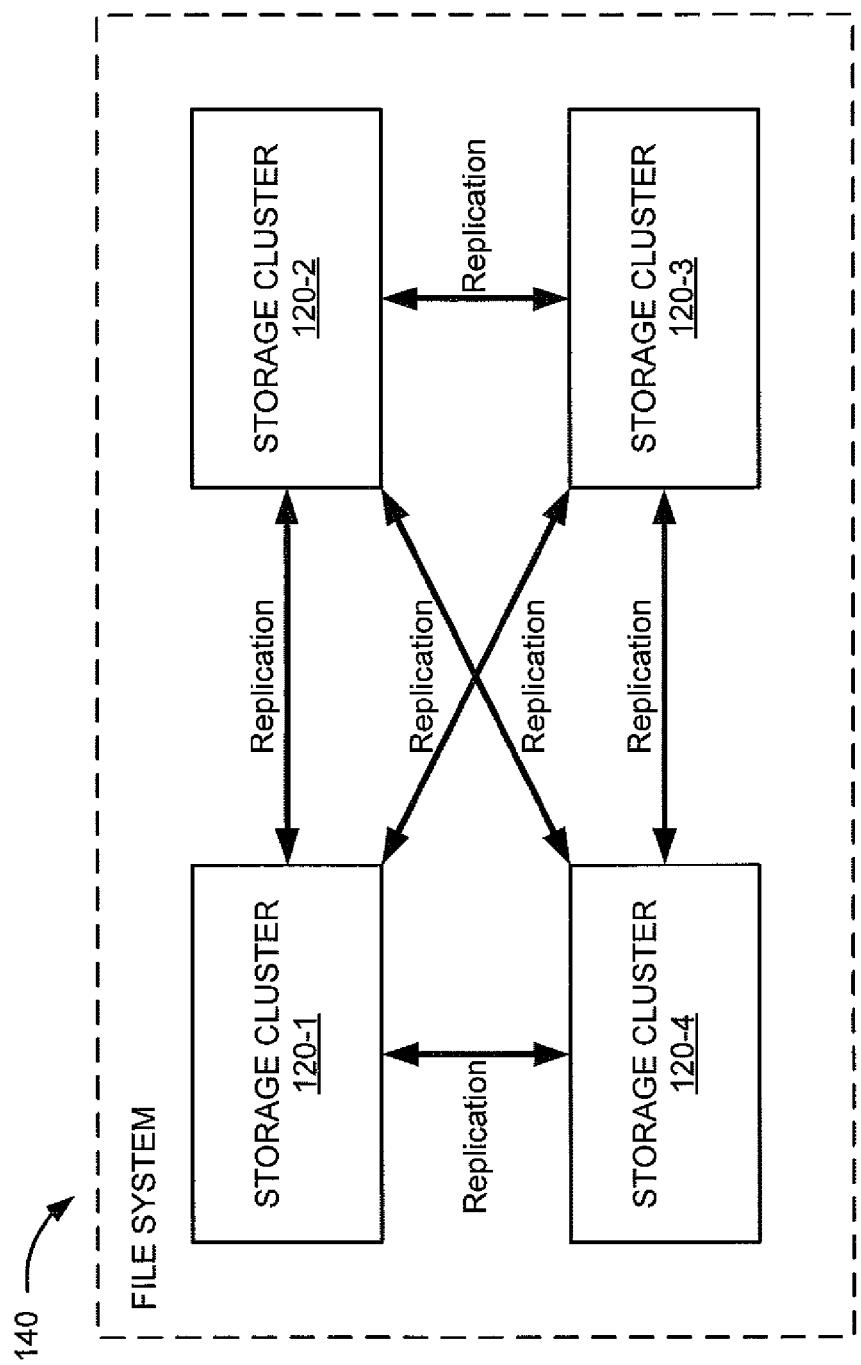
FIG. 2 is a diagram of an exemplary configuration of the file system of FIG. 1.

FIG. 2 is a diagram of an exemplary configuration of the file system 140. As shown in FIG. 2, file system 140 may include storage clusters 120-1, 120-2, 120-3, and 120-4. In one implementation, file system 140 may be a distributed multi-master data replication system, where each of storage clusters 120-1, 120-2, 120-3, and 120-4 may act as a master server for the other storage clusters. In file system 140, data may be replicated across storage clusters 120-1, 120-2, 120-3, and 120-4 (e.g., in multiple geographical locations) to increase data availability and reduce network distance from clients (e.g., clients 110). Generally, distributed objects and references may be dynamically created, mutated, cloned and deleted in different storage clusters 120 and an underlying data replication layer (not shown) maintains the write-order fidelity to ensure that all storage clusters 120 will end up with the same version of data. Thus, the data replication layer respects the order of writes to the same replica for a single object.

Although FIG. 2 shows exemplary functional components of file system 140, in other implementations, file system 140 may contain fewer, additional, different, or differently arranged components than depicted in FIG. 2. In still other implementations, one or more components of file system 140 may perform one or more other tasks described as being performed by one or more other components of file system 140.

Figure 3:
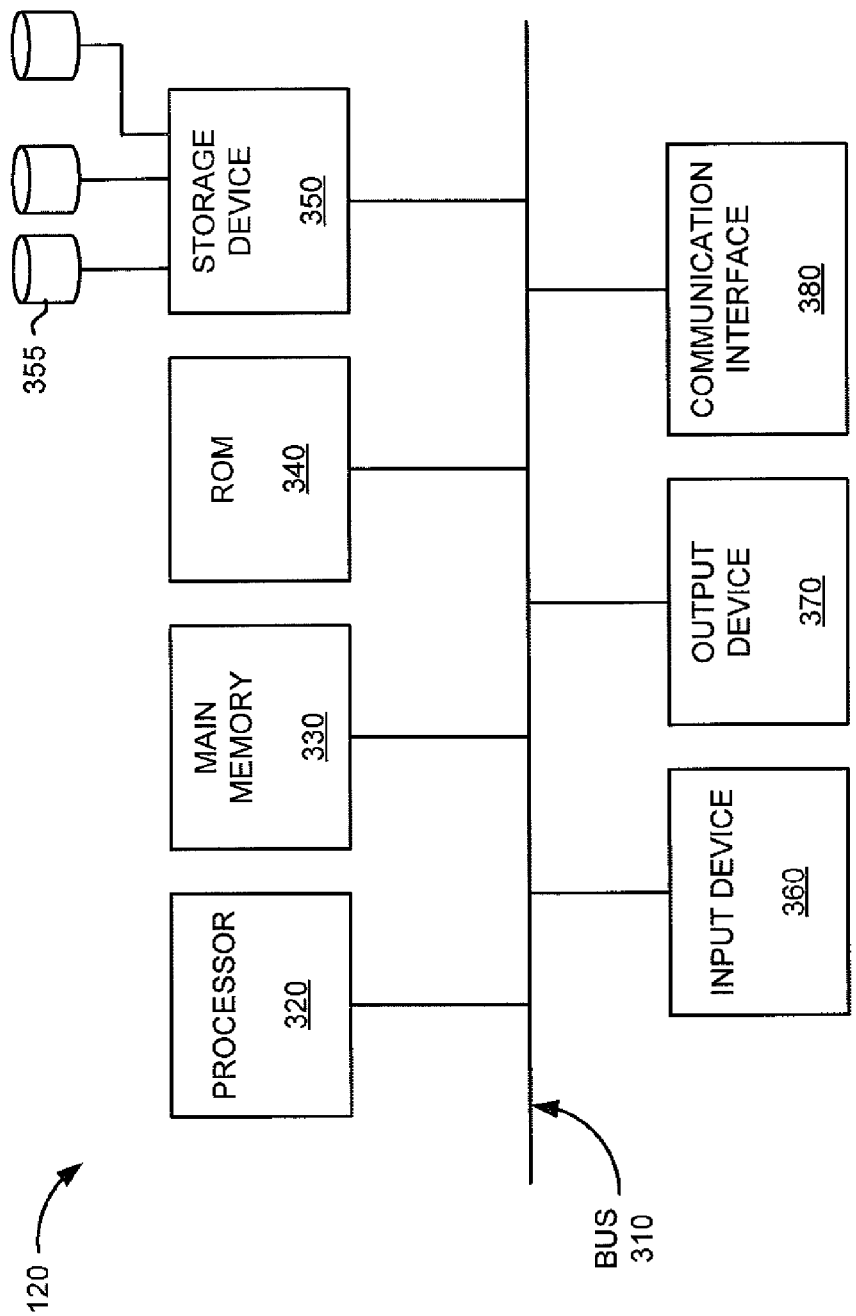
FIG. 3 is a diagram of exemplary components of a storage cluster of FIG. 1.

FIG. 3 is a diagram of exemplary components of storage cluster 120. Storage cluster 120 may include a bus 310, a processor 320, a main memory 330, a ROM 340, a storage device 350, an input device 360, an output device 370, and a communication interface 380. Bus 310 may include one or more conductors that permit communication among the components of storage cluster 120.

Processor 320 may include any type of processor or microprocessor that may interpret and execute instructions. Main memory 330 may include a RAM or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive. For example, storage device 350 may include one or more local disks 355 that provide persistent storage. In one implementation, storage cluster 120 may maintain metadata, for objects stored in file system 140, within one or more computer-readable mediums, such as main memory 330 and/or storage device 350. For example, storage cluster 120 may store version numbers, timestamps, categories, and/or reference indicators for objects within storage device 350.

Input device 360 may include one or more mechanisms that permit an operator to input information to storage cluster 120, such as a keyboard, a keypad, a button, a mouse, a pen, etc. Output device 370 may include one or more mechanisms that output information to the operator, including a display, a light emitting diode (LED), etc. Communication interface 380 may include any transceiver-like mechanism that enables storage cluster 120 to communicate with other devices and/or systems. For example, communication interface 380 may include mechanisms for communicating with other storage clusters 120 and/or clients 110.

Figure 4:
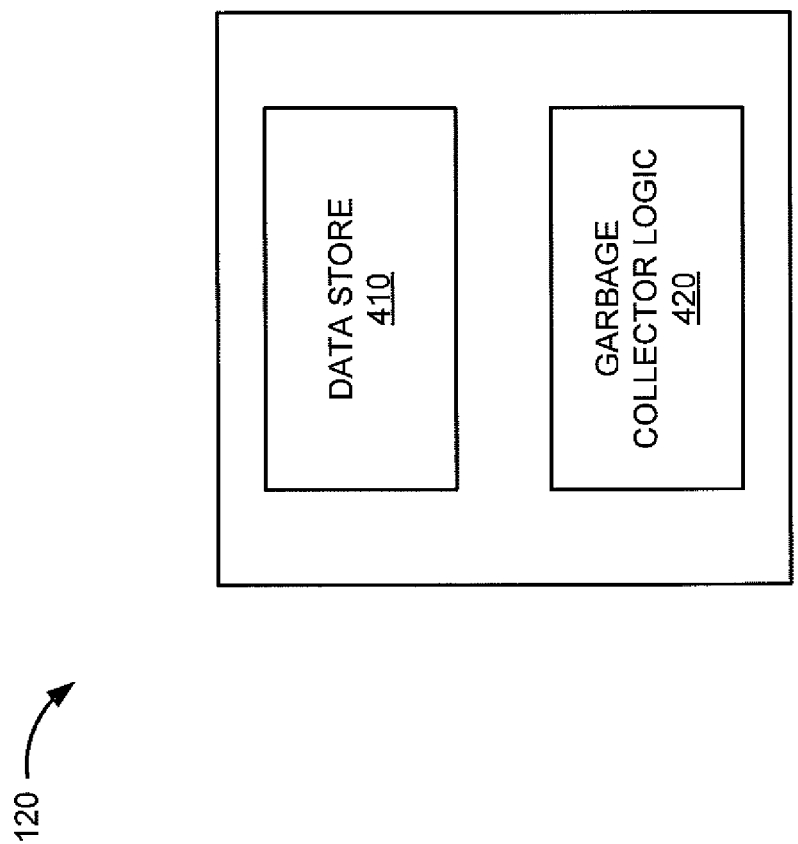
FIG. 4 is a functional block diagram of an exemplary storage cluster of FIG. 1.

FIG. 4 illustrates a functional block diagram of storage cluster 120. As shown in FIG. 4, storage cluster 120 may include data store 410 and garbage collector logic 420. In one implementation, as illustrated in FIG. 4, data store 410 may be provided within storage cluster 120. In other implementations, data store 410 may be provided within one or more other devices of system 100 in communication with storage cluster 120, such as external memory devices or devices associated with an indexing system (not shown).

Data store 410 may include a document table and secondary tables to provide one or more indices for a search system. In one example, the document table and secondary tables may be keyed by a property of a URL to aid in accessing and/or updating of information associated with the URL. At least a portion of each data store 410 may be replicated on multiple storage clusters 120. The number of replicas for each data store 410 may be user-configurable.

Garbage collector logic 420 may include logic to remove non-referenced content, such as previously deleted files. Garbage collector logic 420 may remove non-referenced content from, for example, data store 410. For example, garbage collector logic 420 may determine if an object (e.g., a document) from data store 410 is no longer referenced (i.e., an object that does not include any links pointing to the object), and may remove, from storage cluster 120, any object (e.g., a document) that is no longer referenced via a function (e.g., a MapReduce function) that traverses storage cluster 120 and removes non-referenced objects. An object may be "referenced" or "live" if the object has a link pointing to the object. Thus, garbage collector logic 420 may remove unnecessary information from storage cluster 120 while maintaining live objects.

Removing an object is not as simple as just deleting the object because that object may exist in other storage clusters 120. Thus, garbage collector logic 420 may assemble delete negotiation messages that may be sent between different storage clusters 120 of file system 140. Garbage collector logic 420 may delete an object when a distributed consensus is reached (e.g., among all storage clusters 120 of file system 140 that contain a replica of that object) that neither live references nor replicated references are present in the system. Garbage collector logic 420 may include the delete negotiation messages in metadata of the object that is the subject of the delete negotiation. The messages may then be asynchronously replicated to all other storage clusters 120 containing replicas of the object.

A message generated by garbage collector logic 420 may include, for example, a "Delete" indicator for initiating a delete negotiation, an acknowledgement ("ACK") indicator for providing a positive acknowledgement to a delete negotiation, a negative acknowledgement ("NACK") indicator for providing a negative acknowledgement to a delete negotiation, and a synchronization ("GotAll") indicator for providing a confirmation that acknowledgements have been received from other storage clusters 120. In one implementation, no new references can be added to an object that has an outstanding Delete or ACK message. Message formats and uses are described in more detail below.

Although FIG. 3 shows exemplary functional components of storage cluster 120, in other implementations, storage cluster 120 may contain fewer, additional, different, or differently arranged functional components than depicted in FIG. 3. In still other implementations, one or more functional components of storage cluster 120 may perform one or more other tasks described as being performed by one or more other functional components.

Exemplary Message Structure

Figure 5:
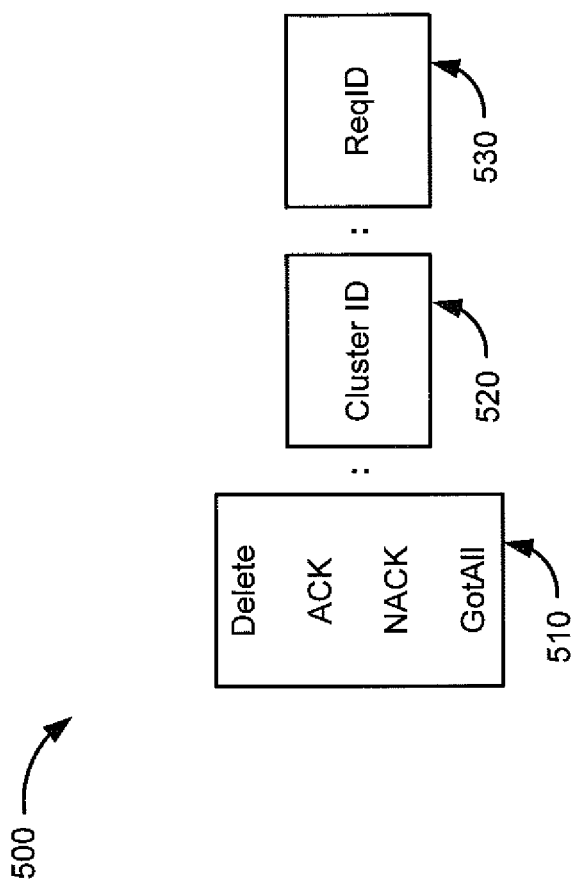
FIG. 5 is an exemplary diagram of a message structure that may be used according to an implementation consistent with the systems and methods described herein.

FIG. 5 provides an illustration of an exemplary message structure 500 for a negotiation message that may be used in an exemplary implementation. As shown in FIG. 5, message structure 500 may include message section 510, storage cluster identification section 520, and negotiation request identification section 530. Message section 510 may include, for example, a "Delete" indicator, an "ACK" indicator, a "NACK" indicator, or a "GotAll" indicator. Storage cluster identification section 520 may include a unique identification (e.g., Cluster ID) for the storage cluster 120 that initiates the message in message section 510. Negotiation request identification section 530 may include a unique identification (e.g., ReqID) for the original delete negotiation.

Message structure 500 may be listed in the form of Message:Cluster ID:ReqID. For example, a delete negotiation for an object may be initiated by storage cluster 120-1 with the message "Delete:01:5555," where "01" is the cluster ID for storage cluster 120-1 and "5555" is the ReqID. An acknowledgement to the negotiation by storage cluster 120-2 may be "ACK:02:5555," where "02" is the cluster ID for storage cluster 120-2 and "5555" remains the ReqID for the acknowledgement (and any future messages pertaining to the original negotiation).

Exemplary Process Flows

Figure 6:
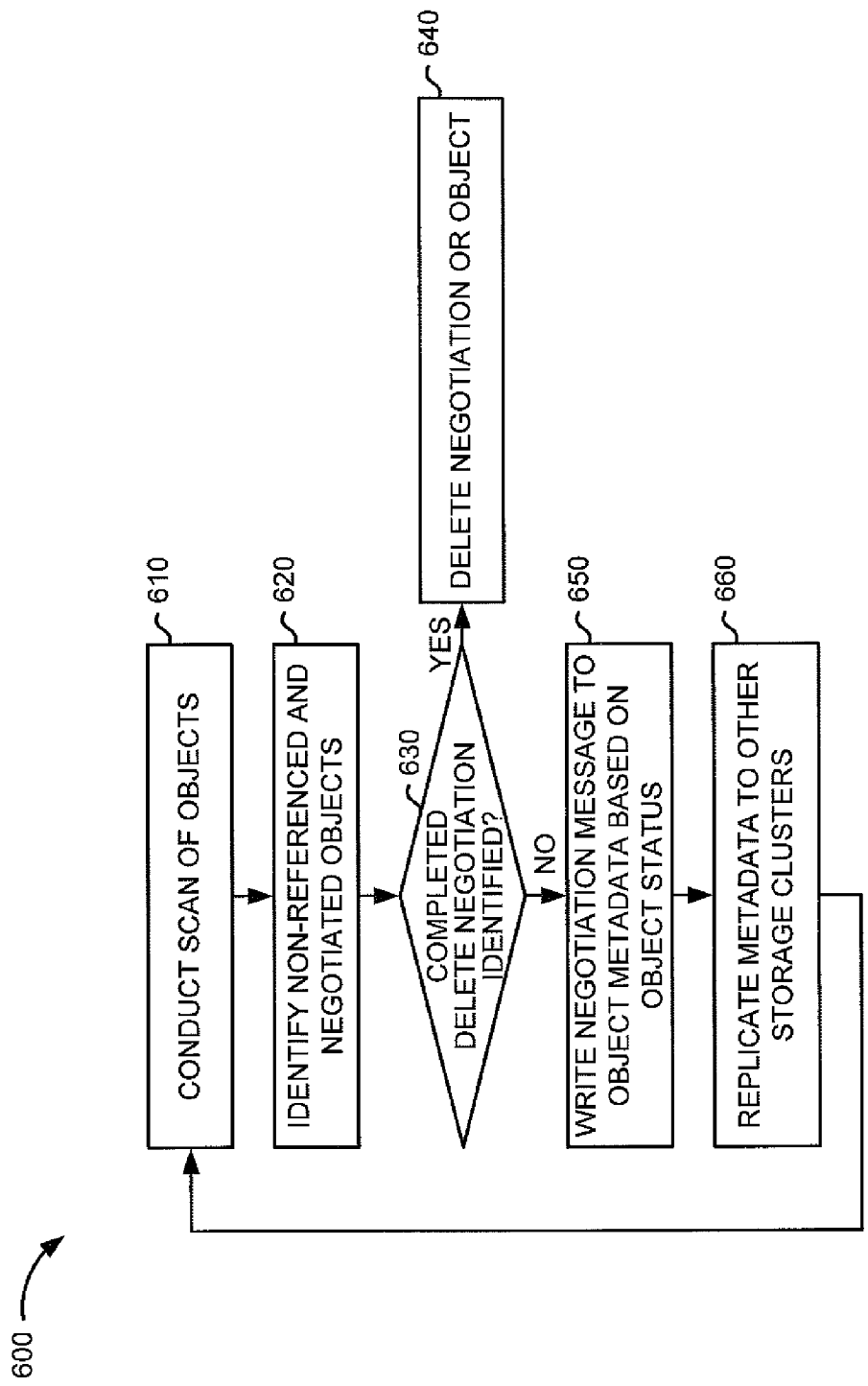
FIG. 6 is a flowchart of an exemplary process for performing garbage collection in a distributed multi-master data replication system according to an implementation consistent with the systems and methods described herein.

FIG. 6 is a flowchart of an exemplary process 600 for performing garbage collection in a distributed multi-master data replication system (e.g., file system 140). In one implementation, process 600 may be performed by one of storage clusters 120. In another implementation, some or all of process 600 may be performed by another device or group of devices, including or excluding storage cluster 120. Process 600 may be implemented periodically in each storage cluster 120 and may include a scan of all or a portion of the objects in the storage cluster 120. For particular examples of process 600 described below, reference may be made to storage cluster 120-1 of file system 140, where the storage cluster 120-1 includes a cluster ID of "01."

As illustrated in FIG. 6, process 600 may begin with conducting a scan of objects (block 610) and identifying non-referenced and negotiated objects (block 620). For example, storage cluster 120-1 (using, e.g., garbage collector logic 420) may conduct a scan of all or a portion of the objects stored in storage cluster 120-1 (e.g., in data store 410). The scan may identify, for example, objects without references and objects with delete negotiation messages by reading the metadata associated with the objects.

It may be determined if a completed delete negotiation is identified for an object (block 630). A completed delete negotiation may be, for example, an indication of a successful or failed delete negotiation. For example, storage cluster 120-1 may identify an object with metadata that confirms either a successful or failed delete negotiation.

If a completed delete negotiation is identified for an object (block 630—YES), then the object of the successful delete negotiation or the failed delete negotiation messages may be deleted by the initiating storage cluster (block 640). In an exemplary implementation, if storage cluster 120-1 identifies metadata in an object indicating that storage cluster 120-1 has previously initiated a delete negotiation for the object and that all other storage clusters storing a replica of the object have recognized (e.g., by writing an ACK message and/or GotAll message to the object metadata) that the object can be deleted, storage cluster 120-1 may delete the object and associated metadata. For example, if the scan in storage cluster 120-1 encounters an object with "Delete:01:ReqID" and "GotAll:*:ReqID" (where "*" indicates the storage cluster ID for each storage cluster 120) from all other storage clusters storing a replica of the object (e.g., storage cluster 120-2,

120-3, and 120-4), the object and the metadata may be deleted. Thus, storage cluster 120-1 may be the initiator of a successful negotiation.

Sill referring to block 640, in another exemplary implementation, if a storage cluster identifies metadata in an object indicating that storage cluster 120-1 has previously initiated a delete negotiation for the object and that at least one other storage cluster 120 has indicated the object should not be deleted by writing a NACK message, storage cluster 120-1 may delete the metadata containing the original negotiation message and all the corresponding messages from the other storage clusters 120. For example, if the scan in storage cluster 120-1 encounters an object with "Delete:01:ReqID," "ACK:*:ReqID" and "NACK:*:ReqID" (where "*" indicates the storage cluster ID) from all other storage clusters 120 and there is at least one NACK message, then all Delete, ACK and NACK messages corresponding to ReqID may be deleted from the metadata associated with the object. Thus, storage cluster 120-1 may be the initiator of a failed negotiation.

If a completed delete negotiation is not identified for an object (block 630—NO), then a negotiation message may be written to the object metadata based on the object status (block 650). As described further herein, based on an object's status, messages (e.g., "Delete," "ACK," "NACK," "GotAll") may be written to the object metadata in one cluster and replicated to all other clusters containing the object replicas. For example, depending on the object status, storage cluster 120-1 may write a new negotiation message to delete an object. Storage cluster 120-1 may alternatively write an ACK message, an NACK message, or a GotAll message in response to an ongoing negotiation. Use of negotiation messages are described further with respect to FIG. 7.

The object metadata may be replicated to other storage clusters (block 660). For example, storage cluster 120-1 may use the underlying replication layer of distributed multi-master data replication system 140 to replicate the negotiation message(s) to storage cluster 120-2, storage cluster 120-3, storage cluster 120-4, etc. Thus, the negotiation messages may be distributed to the other clusters with the object metadata replicas rather than as separate messages.

Process 600 may be repeated until all of the objects in the storage cluster (e.g., storage cluster 120-1) have been scanned and may be repeated periodically. Process 600 may be similarly performed by each of the other storage clusters (e.g., storage clusters 120-2, 120-3, . . . , 120-M) in the distributed multi-master data replication system (e.g., file system 140). Thus, object metadata replicated from the other storage clusters may contain negotiation messages in response to negotiation messages from storage cluster 120-1. Each of the storage clusters may continue to exchange negotiation messages in the replication layer of the file system to asynchronously perform negotiations for objects marked for deletion by the other storage clusters.

Figure 7:
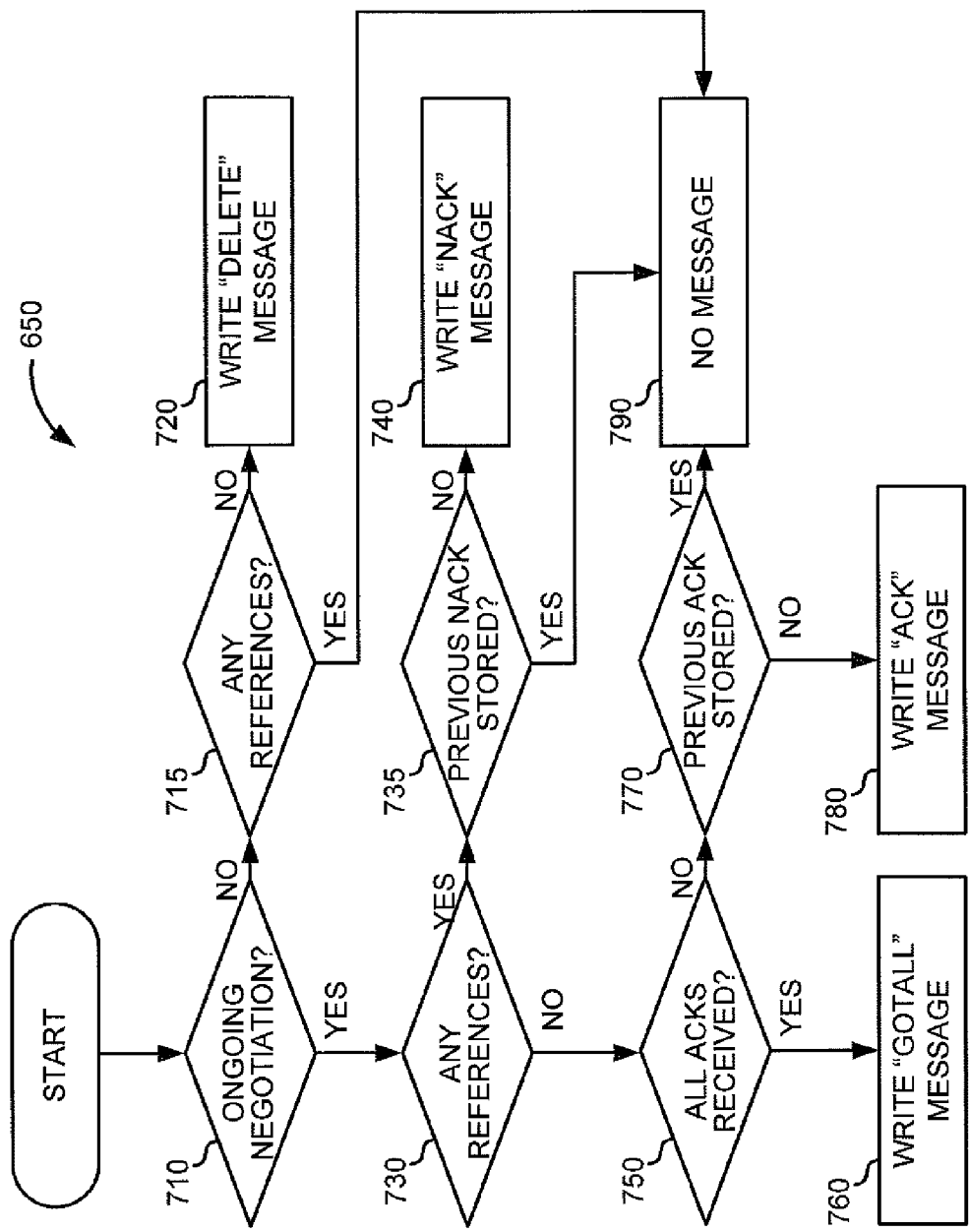
FIG. 7 is a flowchart of an exemplary process for writing a negotiation message according to an implementation consistent with the systems and methods described herein.

FIG. 7 is a flowchart of exemplary process 650 for writing the negotiation message referenced in FIG. 6. Process 650 may be performed by a storage cluster (e.g., one of storage clusters 120) in the distributed multi-master data replication system (e.g., file system 140). For particular examples of process 650, reference may be made to storage cluster 120-1 (having a cluster ID of "01") and storage cluster 120-2 (having a cluster ID of "02") of the distributed multi-master data replication system.

It may be determined if an ongoing negotiation exists (block 710). For example, storage cluster 120-1 (using, e.g., garbage collector logic 420) may determine if the metadata for an object includes a delete negotiation message. In one implementation, a delete negotiation for the object could have been previously initiated by storage cluster 120-1 or may have been initiated, for example, by another storage cluster (e.g., one of storage clusters 120-2, 120-3, or 120-4).

If it is determined that no ongoing negotiation exists (block 710—NO), it may be determined if any references point to the object (block 715). For example, storage cluster 120-1 (using, e.g., garbage collector logic 420) may determine whether a particular object has any references (e.g., by analyzing a directed graph of references). If it is determined that no references point to the object (block 715—NO), a new "delete" message may be written (block 720). For example, if the scan in storage cluster 120-1 encounters an object without references and there is no ongoing negotiation (e.g., no "Delete" message), then storage cluster 120-1 can generate a unique ReqID and write a new delete negotiation message (e.g., "Delete:01:ReqID") for the object. If it is determined that references point to the object (block 715—YES), then no message is required (block 790). For example, if the scan in storage cluster 120-1 encounters an object with references and there is no ongoing delete negotiation, then the object may not require additional processing at this time.

If it is determined that an ongoing negotiation exists (block 710—YES), it may be determined if any references point to the object (block 730). For example, storage cluster 120-1 (using, e.g., garbage collector logic 420) may determine whether a particular object has any references. If it is determined that references point to the object (block 730—YES), it may be determined if a previous negative acknowledgement has already been stored in the object's metadata (block 735). For example, storage cluster 120-1 (using, e.g., garbage collector logic 420) may determine whether a NACK message from storage cluster 120-1 (e.g., "NACK:01:ReqID") is already included in the object's metadata.

If it is determined that a previous negative acknowledgement has not already been stored in the object's metadata (block 735—NO), a negative acknowledgement ("NACK") message may be written (block 740). For example, if the scan in storage cluster 120-1 encounters an object with references and an ongoing negotiation (e.g., "Delete:02:ReqID") from another storage cluster (e.g., storage cluster 120-2), storage cluster 120-1 may write a negative acknowledgement (e.g., "NACK:01:ReqID") to the object's metadata. If it is determined that a previous negative acknowledgement has already been stored in the object's metadata (block 735—YES), then no further processing of the object is required at this time (block 790).

If it is determined that no references point to the object (block 730—NO), then it may be determined if all ACKs have been received (block 750). For example, storage cluster 120-1 (using, e.g., garbage collector logic 420) may determine whether acknowledgements from each storage cluster 120 in system 140 (e.g., "ACK:*:ReqID", where "*" indicates the storage cluster ID) have been included in the object's metadata. If it is determined that all ACKs have been received (block 750—YES), a "GotAll" message may be written (block 760). For example, if the scan in storage cluster 120-1 encounters an object with a delete message (e.g., "Delete:02:ReqID") and acknowledgements from each storage cluster 120 in system 140 (e.g., "ACK:*:ReqID", where "*" indicates the storage cluster ID), storage cluster 120-1 may write an acknowledgement confirmation message (e.g., "GotAll:01:ReqID) for use by the initiator storage cluster 120-2. If it is determined that all ACKs have not been received (block 750—NO), it may be determined if a previous acknowledgement has already been stored in the object's metadata (block 770). For example, storage cluster 120-1 (using, e.g., garbage collector logic 420) may determine whether an ACK message from storage cluster 120-1 (e.g., "ACK:01:ReqID") is already included in the object's metadata.

If it is determined that a previous acknowledgement has not already been stored in the object's metadata (block 770—NO), a new acknowledgement ("ACK") message may be written (block 780). For example, if the scan in storage cluster 120-1 encounters an object with no references and an ongoing negotiation (e.g., "Delete:02:ReqID") from another replica (e.g., storage cluster 120-2), storage cluster 120-1 may write an acknowledgement (e.g., "ACK:01:ReqID") to the object's metadata. If it is determined that a previous acknowledgement has already been stored in the object's metadata (block 770—YES), then no further processing of the object is required at this time (block 790).

Figure 8:
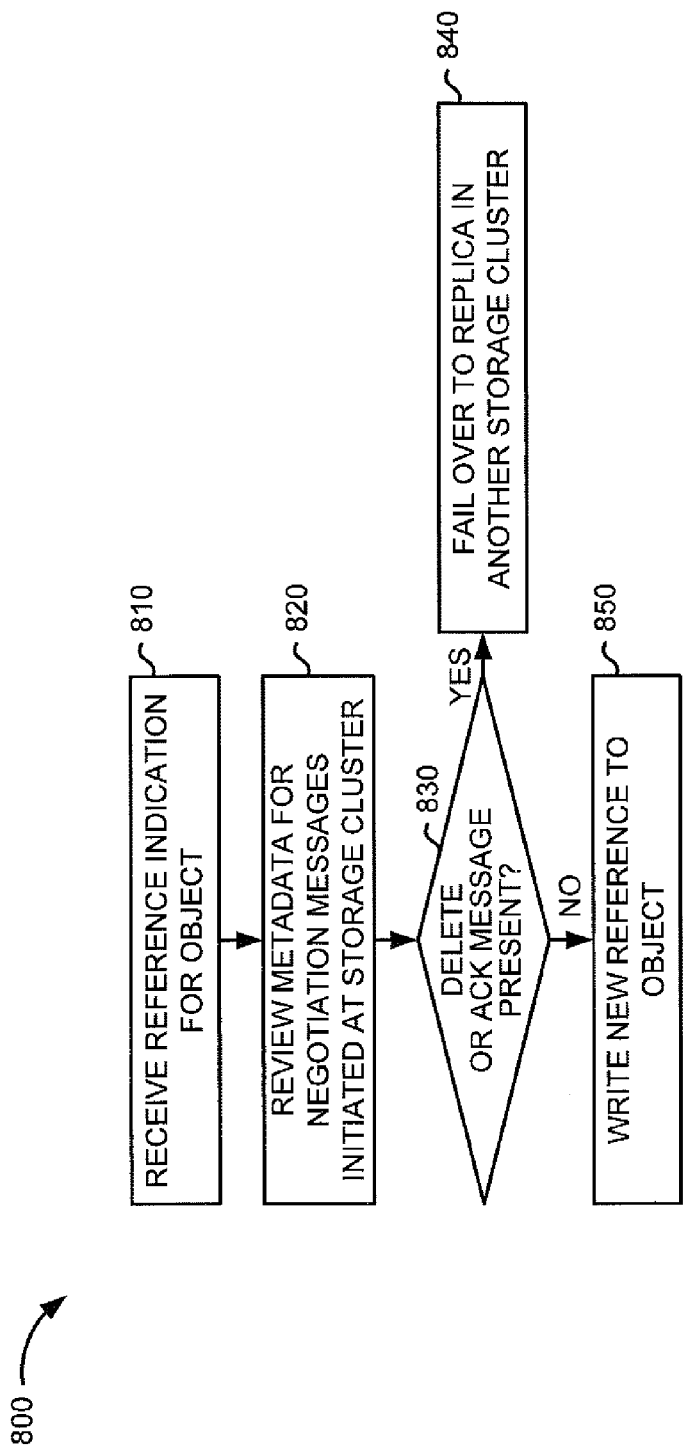
FIG. 8 is a flowchart of an exemplary process for creating a new reference to an object according to an implementation consistent with the systems and methods described herein.

FIG. 8 provides a flowchart of an exemplary process 800 for creating a new reference to an object according to an implementation consistent with the systems and methods described herein. Process 800 may be performed by a storage cluster (e.g., one of storage clusters 120) in the distributed multi-master data replication system (e.g., file system 140). For particular examples of process 800, reference may be made to storage cluster 120-1 (having a cluster ID of "01") of file system 140.

A reference indication for an object may be received (block 810). For example, storage cluster 120-1 may receive a request to add a new reference to an object. The object metadata may be reviewed for negotiation messages initiated at the storage cluster (block 820). For example, storage cluster 120-1 may review the metadata of the object to identify any delete negotiation messages, and particularly any Delete or ACK negotiation messages that were previously initiated by storage cluster 120-1 (e.g., "Delete:01:ReqID" or "ACK:01:ReqID"). In implementations described herein, storage cluster 120-1 may not write a new reference to an object that has an ongoing negotiation in the object metadata with a Delete or ACK message initiated by storage cluster 120-1.

It may be determined if Delete or ACK messages are present (block 830). If a Delete or ACK message is present (block 830—YES), then a replica in another storage cluster may be used as a failover (block 840). For example, if storage cluster 120-1 identifies a "Delete:01:ReqID" message in the object metadata, the message will effectively lock out storage cluster 120-1 from writing a new reference to the object. Thus, a request to write a reference to the object in storage cluster 120-1 will be forwarded to another storage cluster (e.g. storage cluster 120-2).

If no Delete or ACK messages are present (block 830—NO), then the new reference may be written to the object (block 850). For example, storage cluster 120-1 may simply write the requested reference to the live object.

EXAMPLES

Figure 9:
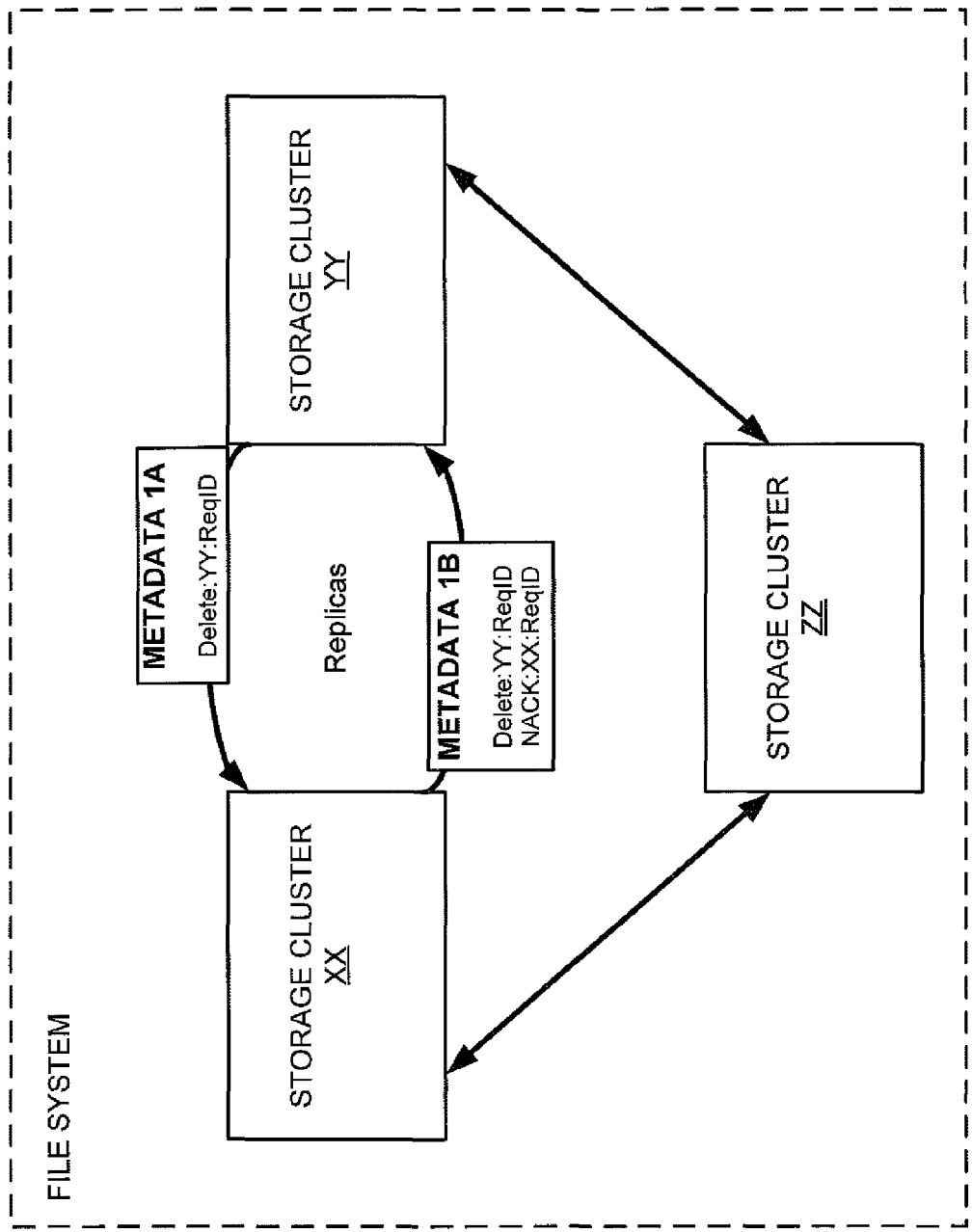
FIG. 9 is a diagram illustrating a portion of an exemplary delete negotiation according to an implementation.

FIG. 9 provides an exemplary network implementing a portion of an exemplary delete negotiation according to implementations described herein. A garbage collection algorithm may run periodically in each of storage clusters XX, YY, and ZZ and may scan all objects in the storage cluster. Messages (e.g., Delete, ACK, NACK, GotAll) may be written by a garbage collector to an object's metadata in one cluster (e.g., storage cluster YY) and replicated to all other clusters (e.g., storage clusters XX and ZZ) containing the object replicas.

The garbage collection algorithm used by the garbage collector can operate using guidelines consistent with the principles described herein. If the garbage collector's scan in storage cluster YY encounters an object without references and there is no ongoing negotiation (e.g., no Delete:YY:ReqID message), then the garbage collector in storage cluster YY can generate a unique ReqID (e.g., 22222) and write "Delete:YY:22222" To the object's metadata. If the garbage collector's scan in storage cluster XX encounters for the first time a delete negotiation (e.g., Delete:YY:22222) from another replica (e.g., from storage cluster YY), the garbage collector writes "ACK:XX:22222" if the object has no references or "NACK:XX:22222" otherwise. Storage cluster XX cannot add new references to an object that has an outstanding Delete:XX:ReqID or ACK:XX:ReqID message. If the garbage collector's scan in storage cluster XX encounters for the first time Delete:YY:22222 and ACK:*:22222 from all other replicas, the garbage collector may write GotAll:XX:22222. In this case, storage cluster XX is not the initiator. If the garbage collector's scan in storage cluster YY encounters Delete:YY:22222 and GotAll:*:22222 from all other replicas, the object and the metadata are deleted. (Storage cluster YY is the initiator of a successful negotiation.) If the garbage collector's scan in storage cluster YY encounters Delete:YY:22222, ACK:XX:22222 and NACK:ZZ:22222 from the other replicas, and since there is at least one NACK message, then all Delete, ACK and NACK messages corresponding to ReqID 22222 are deleted from the object's metadata. In this case, storage cluster YY is the initiator of a failed negotiation.

In the file system of FIG. 9, storage clusters XX, YY, and ZZ may each be designated to store replicas of the object metadata. FIG. 9 shows a replica ("Metadata 1A") of the metadata of an object, "Object 1." Metadata 1A includes a delete negotiation initiated by storage cluster YY being sent to storage cluster XX. In response, storage cluster XX may add a reply message to the object metadata and send the metadata replica ("Metadata 1B") to storage cluster YY. In the file system of FIG. 9, Metadata 1A and Metadata 1B would also be replicated to storage cluster ZZ (not shown). Subsequent metadata replicas (not shown) sent among storage clusters XX, YY, and ZZ may include additional negotiation messages in the Object 1 metadata until a distributed consensus is reached to either delete Object 1 or leave Object 1 untouched and delete the messages pertinent to the negotiation that was initiated by storage cluster YY.

Application of the system and/or methods described herein can provide a protocol availability guarantee, such that an object with a live replica cannot be deleted and can always be available. For example, still referring to FIG. 9, if there is a live replica of Object 1 in storage cluster XX, then the object delete negotiation will not be positively acknowledged by storage cluster XX and thus Object 1 will not be deleted. Also, when a delete negotiation initiated by storage cluster YY is in progress, clone requests (e.g., requests to create a new object reference) in storage cluster YY will succeed through failover (e.g., automatically switching) to the live replica of Object 1 in storage cluster XX.

Application of the systems and/or methods described herein can provide a protocol liveness guarantee. For example, for any initiated delete negotiation request, Delete:XX:ReqID, the garbage collector's scan process in storage cluster YY will eventually write ACK:YY:ReqID or NACK:YY:ReqID and the negotiation process in storage cluster XX will terminate with a Yes/No decision when all these ACKs and/or NACKs have been replicated. Then GotAll:*:ReqID may be written to the object's metadata by all of the storage clusters if the decision is positive, which will finally trigger the actual deletion by storage cluster XX that will propagate to the other storage clusters YY and ZZ through the underlying replication layer. In case a live replica exists in, for example, storage cluster ZZ, the decision is negative and the initiator (e.g., storage cluster XX) may clean the object metadata by deleting the negotiation messages. The cleaned metadata will eventually propagate to all storage clusters that wrote ACK and the object will become available there.

Application of the systems and/or methods described herein can also provide a guarantee that no phantom references can reappear later after an object has been deleted. For example, suppose that Object 1 was first deleted in XX. Based on the garbage collection algorithm, it must be the case that GotAll:*:ReqID from the other storage clusters had been replicated to storage cluster XX before the deletion took place. By this deduction, all replication data destined to storage cluster YY is clean from phantom references being replicated from yet another storage cluster ZZ. This is due to the fact that storage cluster YY writes GotAll:YY:ReqID when all ACKs from the other storage clusters, storage cluster ZZ in particular, have been received while no new references could have been added in storage cluster ZZ after ACK:ZZ:ReqID was written and there were no live references in storage cluster ZZ at this time. Note that there still may be references that are replicated from storage cluster ZZ to storage cluster YY after ACK:YY:ReqID was written and before ACK:ZZ:ReqID was replicated, but all such references can be deleted by the time ACK:ZZ:ReqID is replicated to storage cluster YY as the replication layer respects the order of writes to a single replica.

Application of the systems and/or methods described herein can further provide a no protocol garbage guarantee. For example, if a delete negotiation fails, the initiator will delete the Delete, ACK and NACK negotiation messages and the deletion will propagate to the other object replicas through replication. There remains no garbage, since the algorithm is configured so that all the relevant messages must have been received by the initiator before the deletion by the initiator took place.

CONCLUSION

Systems and/or methods described herein may provide an asynchronous distributed garbage collection algorithm for replicated storage clusters that provides availability, liveness and consistency guarantees. The algorithm uses the underlying replication layer to transport messages between different clusters. Each delete negotiation is initiated by garbage collector logic in one of the clusters and has a unique identifier. The algorithm supports multiple concurrent negotiations. An object may be deleted by the initiator when a distributed consensus is reached; otherwise the negotiation may be voided.

The foregoing description of implementations provides illustration and description, but is not intended to be exhaustive or to limit the invention to the precise form disclosed. Modifications and variations are possible in light of the above teachings or may be acquired from practice of the invention.

For example, in another implementation a synchronous version of the garbage collection algorithm may be used in which garbage collectors in different storage clusters communicate directly rather than using the replication layer.

Also, while series of blocks have been described with regard to FIGS. 6 and 7, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain implementations described herein may be implemented as "logic" that performs one or more functions. This logic may include hardware, such as a processor, microprocessor, an application specific integrated circuit or a field programmable gate array, or a combination of hardware and software (e.g., software executed by a processor).

It should be emphasized that the term "comprises" and/or "comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method of garbage collection for a distributed storage system that stores a plurality of objects at a plurality of devices, at least some of which are at distinct geographic locations, wherein the distributed storage system stores one or more replicas of each object at distinct devices, the method comprising:
    at a first device of the plurality of devices, wherein the first device has one or more processors and memory storing one or more programs configured for execution by the one or more processors:
        identifying a first object of the plurality of objects, wherein the first object is stored in a data store associated with the first device and the first object does not have any object references;
    in response to identifying that the first object does not have any object references, constructing a first delete negotiation message for the first object and storing the first delete negotiation message as metadata associated with the first object;
    replicating the metadata associated with the first object, including the first delete negotiation message, to one or more other devices of the plurality of devices;
    receiving updated metadata for the first object, wherein the updated metadata includes responses from the one or more other devices regarding the first delete negotiation message; and
    when all of the responses from the one or more other devices confirm deletion of the first object, deleting the first object stored in the data store associated with the first device.

2. The method of claim 1, further comprising:
    determining that a second delete negotiation message, relating to the first object, indicates a failed negotiation; and deleting the first delete negotiation message based on the second delete negotiation message indicating the failed negotiation.

3. The method of claim 1, further comprising:
receiving a request to add a new reference to the first object; and
determining not to add the new reference to the object based on the first delete negotiation message.

4. The method of claim 1, wherein the first delete negotiation message
identifies the first device as initiating delete negotiation.

5. The method of claim 1, wherein each response from the one or more other devices is either:
a first indicator associated with providing a positive confirmation to the first delete negotiation message; or
a second indicator associated with providing a negative acknowledgement to the first delete negotiation message.

6. A distributed storage system that stores a plurality of objects at a plurality of devices, at least some of which are at distinct geographic locations, wherein the distributed storage system stores one or more replicas of each object at distinct devices, and each device of the plurality of devices has a respective set of one or more processors and respective memory storing one or more programs configured for execution by the respective one or more processors, the one or more programs comprising instructions for:
identifying a first object of the plurality of objects, wherein the first object is stored in a data store associated with a first device of the plurality of devices and the first object does not have any object references;
in response to identifying that the first object does not have any object references, constructing a first delete negotiation message for the first object and storing the first delete negotiation message as metadata associated with the first object;
replicating the metadata associated with the first object, including the first delete negotiation message, to one or more other devices of the plurality of devices;
receiving updated metadata for the first object, wherein the updated metadata includes responses from the one or more other devices regarding the first delete negotiation message; and
when all of the responses from the one or more other devices confirm deletion of the first object, deleting the first object stored in the data store associated with the first device.

7. The system of claim 6, wherein the one or more programs further comprise instructions for:
determining that a second delete negotiation message, relating to the first object, indicates a failed negotiation; and
deleting the first delete negotiation message based on the second delete negotiation message indicating the failed negotiation.

8. The system of claim 6, wherein the one or more programs further comprise instructions for:
receiving a request to add a new reference to the first object; and
determining not to add the new reference to the first object based on the first delete negotiation message.

9. The system of claim 6, wherein the first delete negotiation message
identifies the first device as initiating delete negotiation.

10. The system of claim 6, wherein each response from the one or more other devices is either:
a first indicator associated with providing a positive confirmation to the first delete negotiation message; or
a second indicator associated with providing a negative acknowledgement to the first delete negotiation message.

11. A non-transitory computer-readable medium storing one or more programs configured for execution by a plurality of devices in a distributed storage system that stores a plurality of objects, wherein at least some of the plurality of devices are at distinct geographic locations, wherein the distributed storage system stores one or more replicas of each object at distinct devices, and wherein each device of the plurality of devices has a respective set of one or more processors and respective memory, the one or more programs comprising instructions for:
identifying a first object of the plurality of objects, wherein the first object is stored in a data store associated with a first device of the plurality of devices and the first object does not have any object references
in response to identifying that the first object does not have any object references, constructing a first delete negotiation message for the first object and storing the first delete negotiation message as metadata associated with the first object;
replicating the metadata associated with the first object, including the first delete negotiation message, to one or more other devices of the plurality of devices;
receiving updated metadata for the first object, wherein the updated metadata includes responses from the one or more other devices regarding the first delete negotiation message; and
when all of the responses from the one or more other devices confirm deletion of the first object, deleting the first object stored in the data store associated with the first device.

12. The computer-readable medium of claim 11, wherein the one or more programs further comprise instructions for:
determining that a second delete negotiation message, relating to the first object, indicates a failed negotiation; and
deleting the first delete negotiation message based on the second delete negotiation message indicating the failed negotiation.

13. The computer-readable medium of claim 11, wherein the one or more programs further comprise instructions for:
receiving a request to add a new reference to the first object; and
determining not to add the new reference to the first object based on the first delete negotiation message.

14. The computer-readable medium of claim 11, wherein each response from the one or more other devices is either:
a first indicator associated with providing a positive confirmation to the first delete negotiation message; or
a second indicator associated with providing a negative acknowledgement to the first delete negotiation message.

* * * * *